(12) United States Patent
Wang et al.

(10) Patent No.: US 9,330,444 B2
(45) Date of Patent: May 3, 2016

(54) MEDICAL IMAGE PROCESSING APPARATUS, MEDICAL IMAGE DEVICE AND IMAGE PROCESSING METHOD

(71) Applicants: Kabushiki Kaisha Toshiba, Minato-ku (JP); Toshiba Medical Systems Corporation, Otawara (JP)

(72) Inventors: Yanhua Wang, Beijing (CN); Nobutoku Motomura, Nasushiobara (JP); Yanli Wang, Beijing (CN)

(73) Assignees: Kabushiki Kaisha Toshiba, Minato-ku (JP); Toshiba Medical Systems Corporation, Otawara-shi (JP)

( * ) Notice: Subject to any disclaimer, the term of this patent is extended or adjusted under 35 U.S.C. 154(b) by 63 days.

(21) Appl. No.: 14/199,001

(22) Filed: Mar. 6, 2014

(65) Prior Publication Data
US 2014/0254898 A1  Sep. 11, 2014

(30) Foreign Application Priority Data
Mar. 6, 2013  (CN) .......................... 2013 1 0071316

(51) Int. Cl.
*G06T 5/00* (2006.01)
*G06T 7/20* (2006.01)
*G06T 11/60* (2006.01)
*G06T 7/00* (2006.01)

(52) U.S. Cl.
CPC ............... *G06T 5/003* (2013.01); *G06T 7/0028* (2013.01); *G06T 7/20* (2013.01); *G06T 11/60* (2013.01); *G06T 2207/10104* (2013.01); *G06T 2207/10108* (2013.01); *G06T 2207/30048* (2013.01)

(58) Field of Classification Search
CPC ........... G06T 5/003; G06T 5/006; G06T 5/50; G06T 7/0022; G06T 7/0024; G06T 7/0038; G06T 7/20
See application file for complete search history.

(56) References Cited

U.S. PATENT DOCUMENTS

| | | | |
|---|---|---|---|
| 2011/0103664 A1 | 5/2011 | Kovalski | 382/131 |
| 2011/0148928 A1 | 6/2011 | Gopalakrishnan et al. | 345/643 |
| 2012/0051664 A1* | 3/2012 | Gopalakrishnan et al. | G06T 11/005 382/294 |
| 2015/0139503 A1* | 5/2015 | Kabus et al. | G06T 7/2046 382/107 |

* cited by examiner

*Primary Examiner* — Andrew W Johns
(74) *Attorney, Agent, or Firm* — Oblon, McClelland, Maier & Neustadt, L.L.P.

(57) ABSTRACT

The present invention relates to a medical image processing apparatus, an image processing method and a medical image device. The medical image processing apparatus comprises a deformation field calculation unit, a deformation field weighting unit and an image deformation unit. The deformation field calculation unit may calculate a field of deformation of a first image of an object with respect to a second image. The deformation field weighting unit may weight the field according to motion intensities of respective components of the object. The image deformation unit may deform the first image by using the weighted field.

16 Claims, 7 Drawing Sheets

MEDICAL IMAGE PROCESSING APPARATUS, MEDICAL IMAGE DEVICE AND IMAGE PROCESSING METHOD

CROSS-REFERENCE TO RELATED APPLICATIONS

This application is based upon and claims the benefit of priority from Chinese Patent Application No. 201310071316.5, filed on Mar. 6, 2013, the entire contents of which are incorporated herein by reference.

FIELD

The present invention relates to the field of information processing and more particularly to a medical image processing apparatus, an image processing method and a medical image device.

BACKGROUND

If a plurality of images are successively acquired from the same object, then it is often needed to acquire information of the images comprehensively. For example, the information of the plurality of images is acquired comprehensively by merging the images.

As it takes a long time to acquire the images, the object may undergo various motions, making it impossible to merge the images acquired directly to acquire information of the images comprehensively.

Therefore, a technology capable of addressing the above described problem is desired.

BRIEF DESCRIPTION OF THE DRAWINGS

The above-mentioned and other objects, characteristics and advantages of the present invention will be more readily understood by reference to the description of embodiments of the present invention made in conjunction with accompanying drawings, in which elements are merely illustrative of the principle of the present invention, and identical or similar reference signs designate identical or similar technical features or elements.

DETAILED DESCRIPTION

A simplified summary of the present invention is given below to provide a basic understanding of some aspects of the present invention. It should be appreciated that the summary, which is not an exhaustive overview of the present invention. The summary is not intended to identify the key or critical parts of the present invention or limit the scope of the present invention, but merely to present some concepts in a simplified form as a prelude to the more detailed description that is discussed later.

It is an object of the present invention to provide a medical image processing apparatus, an image processing method and a medical image device, which are capable of freezing a motion component of an image and reducing image noises.

According to an aspect of the present invention, there is provided a medical image processing apparatus which includes: a deformation field calculation unit, a deformation field weighting unit and an image deformation unit. The deformation field calculation unit may calculate a field of deformation of a first image of an object with respect to a second image. The deformation field weighting unit may weight the field according to motion intensities of the respective components of the object. The image deformation unit may deform the first image by using the weighted field.

According to another aspect of the present invention, there is provided an image processing method which includes: calculating a field of deformation of a first image of an object with respect to a second image; weighting the field according to motion intensities of respective components of the object; and deforming the first image by using the weighted field.

Further, in accordance with still another aspect of the present invention, there is provided a computer program for realizing the aforementioned method.

Additionally, in accordance with still further aspect of the present invention, there is provided a computer program product in the form of at least computer-readable medium, on which computer program codes are recorded to realize the aforementioned method.

These and other advantages of the present invention will be more apparent from the following detailed description of preferred embodiments of the present invention made in conjunction with accompanying drawings.

Preferred embodiments of the present invention are described below with reference to accompanying drawings. The elements and features described in one of the accompanying drawings or embodiments of the present invention may be combined with those shown in one or more other accompanying drawings or embodiments. It should be noted that for the sake of clarity, the presentation and description on the elements and processing that are irrelative with the present invention but well known by those skilled in the art are omitted.

Figure 1A:
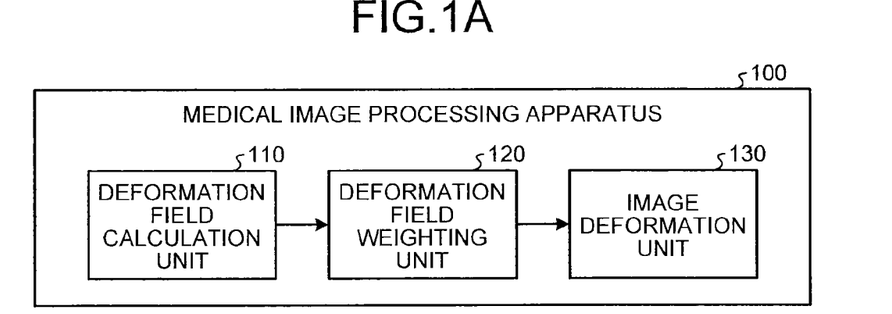
FIG. 1A is a block diagram illustrating the configuration of a medical image processing apparatus according to an embodiment of the present invention.

FIG. 1A is a block diagram illustrating the configuration of a medical image processing apparatus 100 according to an embodiment of the present invention.

As shown in FIG. 1A, the medical image processing apparatus 100 may include a deformation field calculation unit 110, a deformation field weighting unit 120 and an image deformation unit 130.

The deformation field calculation unit 110 may calculate, by taking a second image of an object as a reference image and based on non-rigid registration, a field of deformation of a first image of the object with respect to the reference image, as deformation field.

For example, the object may be the same position of a heart. In other words, the first and second images may be images acquired from the same position of a certain object. For example, for a certain object, a plurality of images may be successively acquired from the same orientation. Additionally, for a certain object, a plurality of images may be successively acquired from different orientations, and in this case, the images, before being processed by the medical image processing apparatus provided herein, need to be changed to the same orientation. However, it should be readily appreciated that the object may be another component of a human body but is not limited to a heart. The 'the same position' mentioned here represents the same region or a whole heart in a two-dimensional or three-dimensional sense.

For example, the first and second images may be medical images formed by the data obtained by a medical diagnostic device. Therefore, it can be readily appreciated that the image herein may be a three-dimensional image but not limited to a two-dimensional image.

According to a spatial transformation relationship, the image registration may be classified into two classes: rigid registration and non-rigid registration. The rigid registration aims at the global deformation of an image, such as the rotation, the translation and the scaling of a whole image, that is, the rigid registration does not include alignment processing of a local deformation in an image. The non-rigid registration aims at various local deformations of an image, that is, the non-rigid registration is an alignment processing performed by using the local deformation of an image (e.g. local warping of an image).

Here, Demons algorithm may be employed to perform the non-rigid registration. However, it should be readily appreciated that other suitable non-rigid registration methods may also be employed in addition to Demons algorithm. For example, a non-rigid registration method, for example, a registration describing a deformation domain based on a basic function, a thin plate spline or B-spline based registration or a registration based on a physical model such as elastic deformation and other registration methods that are not exemplified herein, may be adopted.

Further, it is not limited to use the second image as the reference image, the first image may also be used as the reference image, and the deformation field of the second image of the object with respect to the first image serving as the reference image may be calculated based on non-rigid registration.

In terms of a heart, in the series of images of the heart acquired, the image of the heart in an end diastolic is preferred, since the image of the heart in an end diastolic is much clearer than images of the heart in other stages. In terms of other component of a human body, the image of the part in a specific stage may be specified to be a reference image as needed; alternatively, the image of the part in any stage may be optionally specified to be the reference image with which another image is registered.

The deformation field weighting unit 120 weights the deformation field according to the motion intensities of respective components of the object.

In other words, in order to freeze the motion component of the object and reduce noises of an image, a part in the deformation field corresponding to a motion component and a part in the deformation field corresponding to a non-motion component may be treated differently. For example, the deformation field weighting unit 120 may set the weight of the deformation field of the motion component of the object to be 1 and the weight of the deformation field of the non-motion component of the object to be smaller than 1 (e.g. 0).

For example, the component having moving intensity greater than a first threshold may be taken as the motion component, while the component having moving intensity smaller than a second threshold is taken as the non-motion component, wherein the first threshold is greater than the second threshold. In this case, the component having motion intensity between the first and second thresholds may be taken as a transition component. For example, the deformation field weighting unit 120 may set the weight of the deformation field of the transition component between the motion component and the non-motion component of the object to be between the weights of the deformation fields of the motion component and the non-motion component.

Certainly, the motion component may be distinguished from the non-motion component in other ways. For example, when the first threshold is equal to the second threshold, a component having motion intensity higher than the specific threshold may be taken as the motion component, while a component having motion intensity lower than the specific threshold is taken as the non-motion component. The deformation field weighting unit 120 may still set the weight of the deformation field of the motion component of the object to be 1 and the weight of the deformation field of the non-motion component of the object to be smaller than 1 (e.g. 0).

Preferably, the motion component and the non-motion component may be distinguished from each other without using a threshold; instead, the weight of a part in the deformation field corresponding to a component of the object may be set in proportion to the value of the motion intensities of the component, wherein the maximum value of the weight is 1.

Further, the deformation field weighting unit 120 may locate a motion region and a non-motion region according to a variance image, which is an image of variance of the second image and the plurality of first images and is capable of reflecting the motion intensities of respective components of the object and weight the deformation field.

The variance image mentioned herein may be, for example, the variance image of the grayscales of the second image and the plurality of first images. However, it should be appreciated that the variance image mentioned herein is not limited to this, as long as the variance image is capable of reflecting the motion intensities of respective components of the object.

The variances of respective points of the variance image can be calculated by the following formula (1):

$$D(i, j, k) = \text{sqrt}\left(\left(\sum_{n=1}^{N}(R_n(i, j, k) - \overline{R}(i, j, k))^2\right) / N\right), \quad (1)$$

wherein (i, j, k) represents the position of a point, D(i, j, k) represents the variance of the current point, and N represents the total number of images.

$R_n(i, j, k)$ represents the grayscale value of a point $(i, j, k)$ in the $n^{th}$ image, and $\overline{R}(i,j,k)$ represents the mean of the grayscale value of the point $(i, j, k)$. The mean $\overline{R}(i,j,k)$ is calculated by the following formula (2):

$$\overline{R}(i, j, k) = \left(\sum_{n=1}^{N} R_n(i, j, k)\right) / N \quad (2)$$

After the variance is calculated, the weighted deformation field may be calculated by the following formulas (3) and (4):

$$WF_{new}(i,j,k) = WF(i,j,k) * MW(i,j,k) \quad (3)$$

$$MW(i,j,k) \propto D(i,j,k) * f(i,j,k) \quad (4)$$

wherein $(i, j, k)$ represents a position, $WF(i, j, k)$ represents a deformation field before weighting of motion, $WF_{new}(i, j, k)$ represents a deformation field after weighting of motion, $MW(i, j, k)$ represents a motion weight capable of characterizing $D(i, j, k)$ and motion intensities, f is a function, for example, a variance image normalization function or a moving/motionless region nonlinear function, which is capable of making the motion weight MW present a specific trend.

Figure 1B:
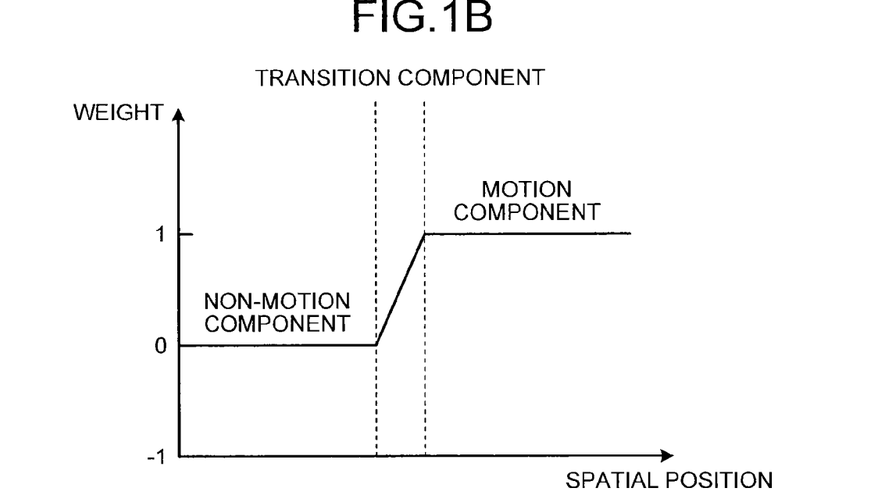
FIG. 1B is a graph illustrating an example of a specific trend presented by the weight used for weighting a deformation field.

FIG. 1B is a graph illustrating an example of a specific trend presented by the weight used for weighting a deformation field. As shown in FIG. 1B, the weight of the motion component is 1, the weight of the non-motion component is 0, and the weight of the transition component is a linear value between 0 and 1.

Figure 1C:
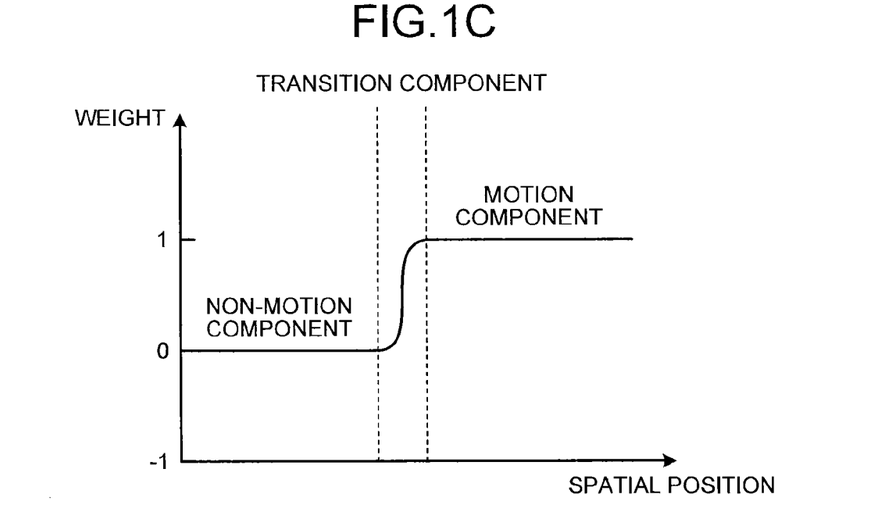
FIG. 1C is a graph illustrating an example of another specific trend presented by the weight used for weighting a deformation field.

FIG. 1C is a graph illustrating an example of another specific trend presented by the weight used for weighting a deformation field. As shown in FIG. 1C, the weight of the motion component is 1, the weight of the non-motion component is 0, and the weight of the transition component is a nonlinear value between 0 and 1. In case of using the weight shown in FIG. 1C, the motion component and the transition component as well as the transition component and the non-motion component in the third image acquired are connected more smoothly.

However, it should be readily appreciated that f is not limited to the specific trend shown in FIG. 1B, and may be any suitable trend, as long as the trend meets a rule that the greater the motion intensities is, the greater the weight is, wherein the maximum value of the weight is 1. For example, the weight of the motion component is 1, the weight of the non-motion component is 0.5, and the weight of the transition component is a linear or nonlinear value between 0.5 and 1.

The image deformation unit 130 deforms the first image by using the deformation field weighted by the deformation field weighting unit 120, so as to obtain a third image.

During the process of calculating a deformation field, due to the influence caused by the noises in the first image or the intrinsic deficiency of the deformation field calculation algorithm, a deformation may occur in both an actually motion component and an actually non-motion component of the object in the deformation field obtained based on the first image. If all the parts of the deformation field are applied to the first image without being distinguished, then noises will be brought to the actually non-motion component (a deformation which should not be performed is performed) or noises will be increased in the third image obtained. By means of weighting proposed in the present invention, the weight of a part in the deformation field corresponding to a motion component is higher that of a part in the deformation field corresponding to a non-motion component, as a result, the non-motion component and a transition component are not significantly influenced by the deformation field, and thus, the present invention avoids an undesired deformation or an amplification on noises to some extent. In other words, in each third image obtained in this way, the motion component is frozen (the motion component in the first image is deformed to a corresponding position in the second image or a position nearby the corresponding position through deformation), and the generation of new noises or the increase in existing noises are prevented for the non-motion component and the transition component.

Further, in the embodiment that will be described below, when a plurality of third images are merged, a small weight is set for a non-motion component to prohibit a deformation effect on noises, which avoids the deformation of noises to the same or an adjacent position (similar noises in the plurality of first images may be mistakenly considered as the motion of noise points by the deformation field algorithm), and further avoids the mutual enhancement of the noises in the plurality of first images. On the contrary, as the randomness of the original noises in the first image is maintained, the merging of the plurality of third images has an effect of reducing noises.

Descriptions are made below by taking the PET (Positron Emission Tomography) and/or SPECT (Single Photon Emission Computed Tomography) as examples.

Usually, it takes a long time, e.g. several minutes or even more than ten minutes, to acquire the image of a heart during a PET and/or SPECT.

During this period, the patient usually undergoes various motions, such as breathing motion or heart motion, thus leading to blurred motion component in the image acquired.

In the currently available technologies for addressing the problem, a cardiac cycle is divided into a plurality of time periods by using a gating technology, and image data corresponding to each time period is acquired. However, both the signal-to-noise ratio and the photon number of the image acquired in each time period are low.

In this case, the deformation field calculation unit 110, the deformation field weighting unit 120 and image deformation unit 130 can perform the aforementioned processing on the plurality of images acquired. Specifically, for example, the weight of the deformation field of a motion component (e.g. cardiac muscle) is set to be 1 and the weight of the deformation field of a non-motion component (another component) is set to be smaller than 1 (e.g. 0) so that the motion component is frozen and the non-motion component and a transition component are frozen partially or not frozen. Therefore, in the image weighted by the weighted deformation field, motion components (e.g. cardiac muscles) are more spatially matched with each other, while the non-motion component is spatially intersected with the transition component. If the images are merged, then an image is acquired in which a motion component (e.g. cardiac muscle) is clear and a non-motion component and a transition component are de-noised based on a mean.

However, it should be readily appreciated that the first and second images processed are not limited to such images having low photon number and low signal-to-noise ratio, the motion component freezing and noise reducing effect is also effective to other images.

Further, the image processed is not limited to the image of a heart, and may be the image of other organs (e.g. liver, lung and gallbladder) undergoing such motion.

Further, the image processed is not limited to a medical image, and may be a non-medical image of an object undergoing a similar motion.

In some embodiments, the second image and the plurality of first images may be merged. Embodiments of the merging of images are described later with reference to FIG. 7.

Figure 2:
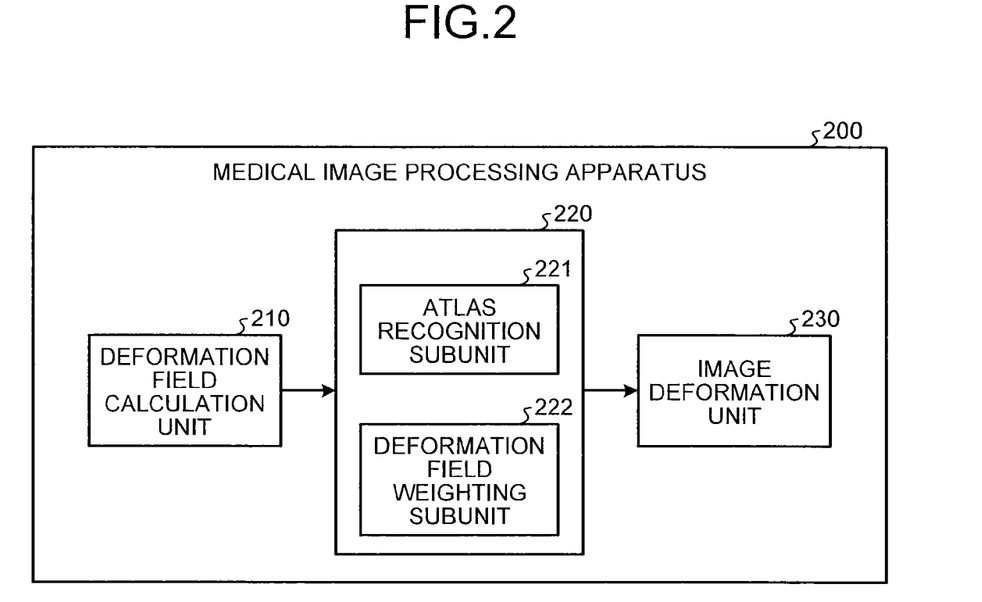
FIG. 2 is a block diagram illustrating the configuration of a medical image processing apparatus according to another embodiment of the present invention.

FIG. 2 is a block diagram illustrating the configuration of a medical image processing apparatus 200 according to another embodiment of the present invention.

As shown in FIG. 2, the medical image processing apparatus 200 includes a deformation field calculation unit 210, a deformation field weighting unit 220 and an image deformation unit 230.

The medical image processing apparatus 200 shown in FIG. 2 is different from the medical image processing apparatus 100 shown in FIG. 1A in including an atlas recognition subunit 221 and a deformation field weighting subunit 222.

The atlas recognition subunit 221 may recognize respective components of the object from the first image based on an atlas.

If the respective components of the object are recognized, the motion information of respective components may be looked out in a lookup table in which the motion intensities corresponding to respective components are included.

Alternatively, assuming the motion intensities corresponding to respective components are included in the atlas, the motion intensities corresponding to respective components of the object are simultaneously acquired when the components are recognized.

The deformation field weighting subunit 222 weights the deformation field according to the spatial distribution of the motion intensities of respective components recognized by the atlas recognition subunit 221.

Figure 3:
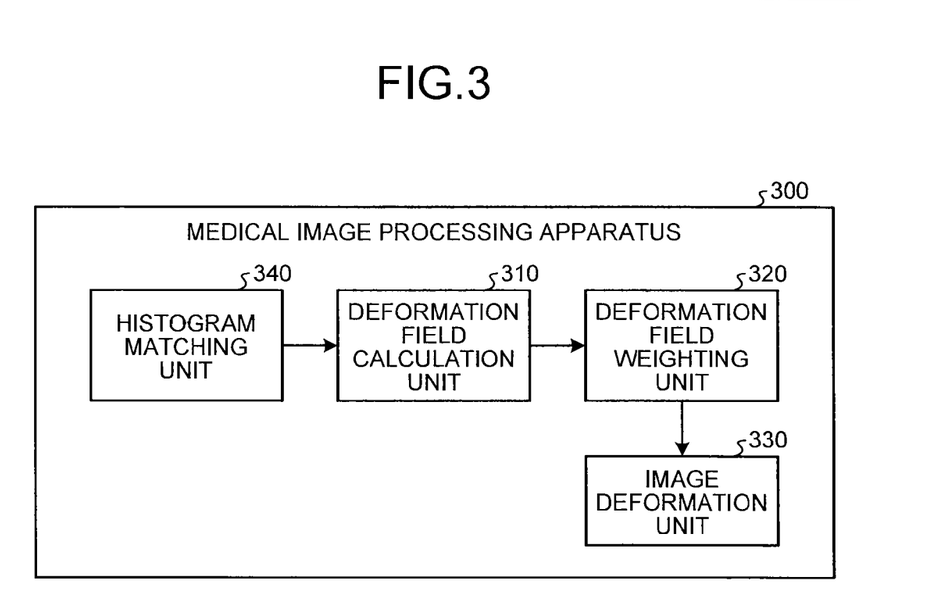
FIG. 3 is a block diagram illustrating the configuration of a medical image processing apparatus according to still another embodiment of the present invention.

FIG. 3 is a block diagram illustrating the configuration of a medical image processing apparatus 300 according to still another embodiment of the present invention.

As shown in FIG. 3, the medical image processing apparatus 300 may include a deformation field calculation unit 310, a deformation field weighting unit 320, an image deformation unit 330 and a histogram matching unit 340.

The medical image processing apparatus 300 shown in FIG. 3 is different from the medical image processing apparatus 100 shown in FIG. 1A in further including a histogram matching unit 340.

The change in the grayscale of an image acquired for some objects (e.g. cardiac muscle) is significant. In this case, the first and second images may be subjected to histogram matching before a deformation field is calculated so that the first and second images have similar grayscale ranges.

The histogram matching unit 340 performs histogram matching on histograms of the first and second images to make the first image have a grayscale range similar to that of the second image. In this case, the deformation field calculation unit 310 calculates the deformation field of the first image having the grayscale range similar to the second image with respect to the second image.

Figure 4:
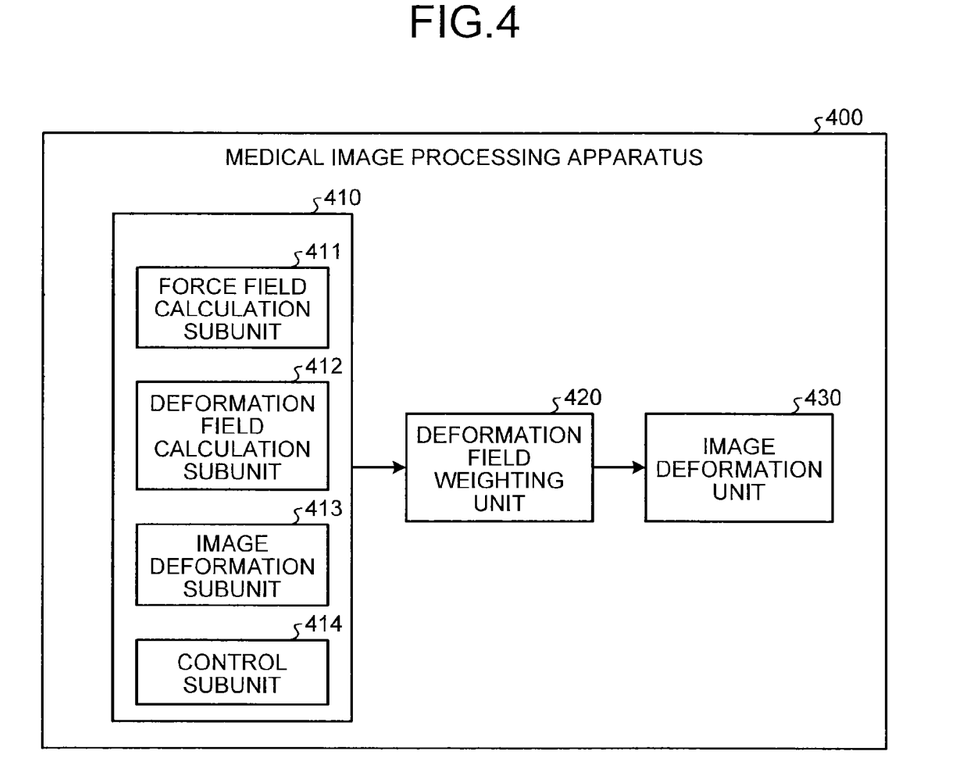
FIG. 4 is a block diagram illustrating the configuration of a medical image processing apparatus according to still another embodiment of the present invention.

FIG. 4 is a block diagram illustrating the configuration of a medical image processing apparatus 400 according to an embodiment of the present invention.

As shown in FIG. 4, the medical image processing apparatus 400 may include a deformation field calculation unit 410, a deformation field weighting unit 420 and an image deformation unit 430, wherein the deformation field calculation unit 410 may include a force field calculation subunit 411, a deformation field calculation subunit 412, an image deformation subunit 413 and a control subunit 414.

The force field calculation subunit 411 may calculate the force field of the first image with respect to the second image serving as a reference image.

In the use of Demons algorithm, a force field $\bar{v}$ is calculated by the following formula (5):

$$\bar{v} = \frac{(r - f \cdot s)\nabla(f \cdot s)}{(r - f \cdot s)^2 K + \nabla(f \cdot s)^2} \qquad (5)$$

wherein the constant K is a value for controlling a gradient decent speed, r is the grayscale of a second image serving as a reference image, f is the grayscale of a first image, and s is a deformation field calculated in the last iteration.

The deformation field calculation subunit 412 calculates a deformation field according to the force field calculated by the force field calculation subunit 411.

Assuming the deformation field for the $n^{th}$ deformation is $WF_n$ and the deformation field for the $(n-1)^{th}$ deformation is $WF_{n-1}$, then the two deformation fields meet the following formula (6):

$$WF_n = WF_{n-1} + \Delta_n \qquad (6)$$

in which represents the increment of the deformation field in the $n_{th}$ iteration. The increment may be calculated based on the force field by using group optimization.

The image deformation subunit 413 deforms the first image by using the deformation field calculated by the deformation field calculation subunit 412.

The control subunit 414 may control the force field calculation subunit 411, the deformation field calculation subunit 412 and the image deformation subunit 413 to repeat the above operations by using the first image after being deformed in the current iteration as the first image before being deformed in the next iteration, until a predefined condition is met, so as to obtain a final deformation field.

In fact, during the non-rigid registration process, as the times of iteration increases, the corresponding components in the first and second image are closer to each other in spatial position, usually accompanied by an increasing similarity (e.g. a normalization-related coefficient) of the two images with the trend of the increasing lowering. However, the similarity sometimes reduces slightly as the times of iteration increases. Therefore, at least one of the following three predefined conditions can be adopted.

Predefined condition 1: iteration times. For example, the iteration times may be selectively set to be 4-20. However, the iteration times may be another proper value if needed, but is not limited to this range.

Preset condition 2: decrement of similarity, for example, the decrement of a normalized correlation. A determination may be made to determine whether or not a normalized correlation is reduced sharply, for example, a determination may be made to determine whether or not the decrement of the normalized correlation is greater than a threshold. If the decrement is greater than the threshold, then it is determined that the predefined condition is met.

Preset condition 3: increment of similarity in the last several (e.g. four) iterations, for example, the increment of a normalized correlation. For example, if the average increment of a normalized correlation in the last several iterations is smaller than a predefined threshold (e.g. 0.001), then it is determined that the predefined condition is met.

Further, the control subunit 414 may further control the force field calculation subunit 411 not to perform viscous restriction on the force field.

The control subunit 414 may further control the deformation field calculation subunit 413 not to perform elastic restriction on the deformation field, that is, the deformation field calculation subunit 413 performs no elastic restriction on the deformation field before the deformation field calculation unit 340 obtains a final deformation field.

In other words, the elastic restriction and/or viscous restriction is removed during the registration iteration processing of the deformation field calculation unit 410.

In case that the acquired image has small photon number and/or size, deformation can be avoided or weakened by removing elastic restriction and/or viscous restriction.

For example, in terms of the PET and/or SPECT image of a heart, if observed two-dimensionally, the myocardium/blood pool component in the image of a heart in an end diastolic may have a thickness of merely several pixels. Meanwhile, neighboring pixels may move towards different directions because of the contraction and expansion of the heart. In this case, the deformation of the blood pool can be avoided or weakened by removing elastic restriction and/or viscous restriction to obtain a deformation field capable of reflecting the real motion of the heart, especially for an image of the heart in an end diastolic.

Figure 5:
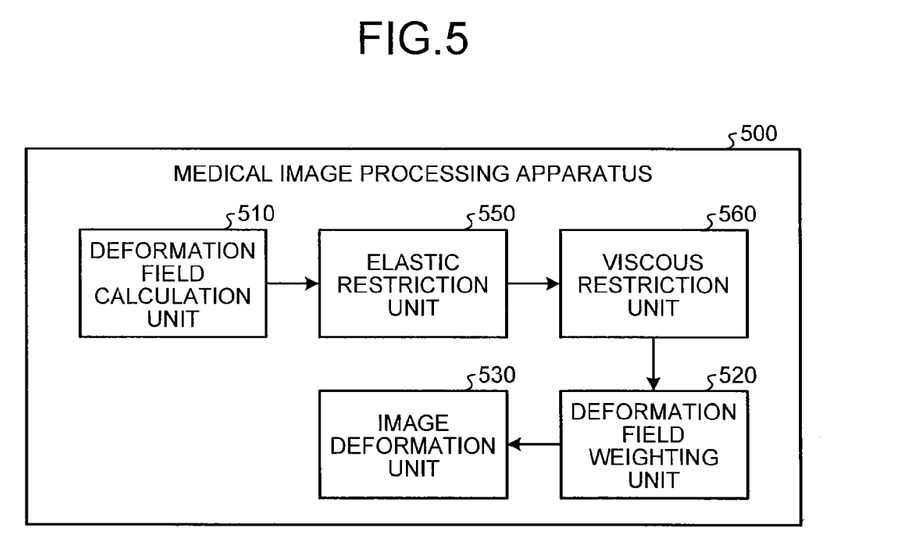
FIG. 5 is a block diagram illustrating the configuration of a medical image processing apparatus according to yet another embodiment of the present invention.

FIG. 5 is a block diagram illustrating the configuration of a medical image processing apparatus 500 according to yet another embodiment of the present invention.

As shown in FIG. 5, the medical image processing apparatus 500 includes a deformation field calculation unit 510, an elastic restriction unit 550, a viscous restriction unit 560, a deformation field weighting unit 520 and an image deformation unit 530.

The medical image processing apparatus 500 shown in FIG. 5 is different from the medical image processing apparatus 100 shown in FIG. 1A in further including an elastic restriction unit 550 and a viscous restriction unit 560.

The elastic restriction unit 550 performs elastic restriction on the deformation field calculated by the deformation field calculation unit 510. For example, the elastic restriction may include, but not limited to, Gauss filtering, and any other proper elastic restriction.

The viscous restriction unit 560 may perform viscous restriction on the deformation field calculated by the deformation field calculation unit 510.

For example, the viscous restriction may be, but not limited to, median filtering, and any other proper viscous restriction.

By performing elastic restriction and viscous restriction on the deformation field after the registration iteration processing of the deformation field calculation unit 510, instead of performing viscous restriction on the force field and elastic restriction on the deformation field during the registration iteration processing process, abnormal points in the deformation field are removed or reduced.

In some embodiments, the elastic restriction unit 550 and the viscous restriction unit 560 may not be included at the same time. One of the elastic restriction unit 550 and the viscous restriction unit 560 may be included as needed.

Additionally, in some embodiments, if needed, the elastic restriction unit 550 may perform elastic restriction after the viscous restriction unit 560 performs viscous restriction.

Figure 6:
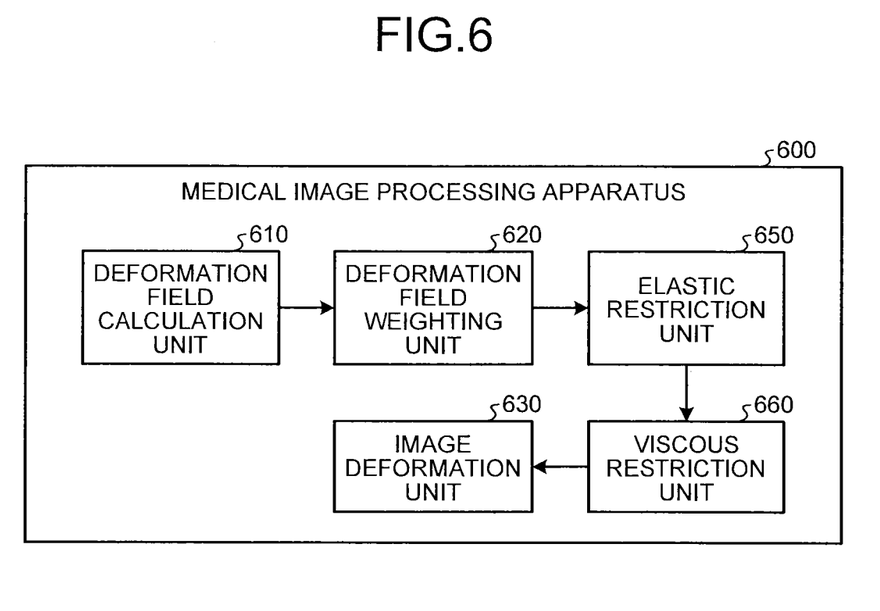
FIG. 6 is a block diagram illustrating the configuration of a medical image processing apparatus according to yet another embodiment of the present invention.

FIG. 6 is a block diagram illustrating the configuration of a medical image processing apparatus 600 according to yet another embodiment of the present invention.

The medical image processing apparatus 600 includes a deformation field calculation unit 610, a deformation field weighting unit 620, an elastic restriction unit 650, a viscous restriction unit 660 and an image deformation unit 630.

The difference of the medical image processing apparatus 600 shown in FIG. 6 from the medical image processing apparatus 500 shown in FIG. 5 lies in that the elastic restriction unit 650 performs elastic restriction on the deformation field weighted by the deformation field weighting unit 620 and the viscous restriction unit 660 performs viscous restriction on the deformation field weighted by the deformation field weighting unit 620 while the elastic restriction unit 550 performs elastic restriction on the deformation field calculated by the deformation field calculation unit 510 and the viscous restriction unit 560 performs viscous restriction on the deformation field calculated by the deformation field calculation unit 510.

By performing elastic restriction and viscous restriction on the weighted deformation field after the registration iteration processing of the deformation field calculation unit 610, instead of performing viscous restriction on the force field and elastic restriction on the deformation field during the registration iteration processing process, abnormal points in the weighted information field are removed or reduced.

In some embodiments, the elastic restriction unit 650 and the viscous restriction unit 660 may not be included at the same time. Only one of the elastic restriction unit 650 and the viscous restriction unit 660 may be included as needed.

In addition, in some embodiments, if needed, the viscous restriction unit 660 may perform viscous restriction before the elastic restriction unit 650 performs elastic restriction.

For example, the elastic restriction may include Gauss filtering, and the viscous restriction may include median filtering.

Figure 7:
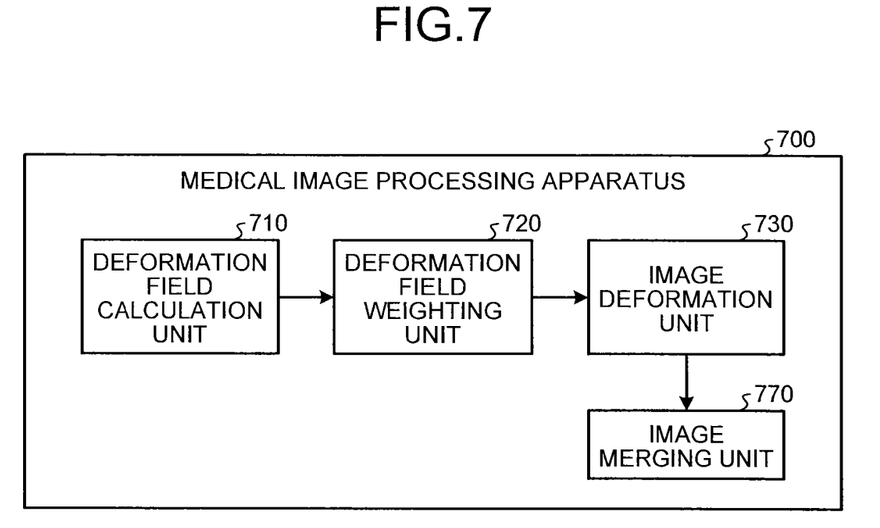
FIG. 7 is a block diagram illustrating the configuration of a medical image processing apparatus according to still yet another embodiment of the present invention.

FIG. 7 is a block diagram illustrating the configuration of a medical image processing apparatus 700 according to yet another embodiment of the present invention.

The medical image processing apparatus 700 includes a deformation field calculation unit 710, a deformation field weighting unit 720, an image deformation unit .730 and an image merging unit 770.

The medical image processing apparatus 700 shown in FIG. 7 is different from the medical image processing apparatus 100 shown in FIG. 1A in further including an image merging unit 770.

Similar to the image forming apparatus 100, the deformation field calculation unit 710 calculates, by taking a second image of an object as a reference image and based on non-rigid registration, a field of deformation of a first image of the object with respect to the reference image, as a deformation field, the deformation field weighting unit 720 weights the deformation field according to the motion intensities of respective components of the object, and the image deformation unit 730 deforms the first image by using the weighted deformation field to obtain a third image.

The image merging unit 770 may merge at least two of the second image serving as a reference image and the plurality of the third images obtained by the image deformation unit 730 to obtain the final image of the object.

In other words, at least two of the second image and the third images resulting from the deformation are merged to obtain the final image of the object.

In the third image obtained by deforming the first image by using the weighted deformation field, a motion component is frozen and noises are reduced. By merging the second image with the third image in which a motion component is frozen and noises are reduced, a high-quality final image is obtained. For example, in the medical field, a specific region, for example, a diseased region, can be observed more easily in the final merged image.

The merging mentioned herein may be, but not limited to, a median filtering for a plurality of images, and any other proper merging method.

Figure 8:
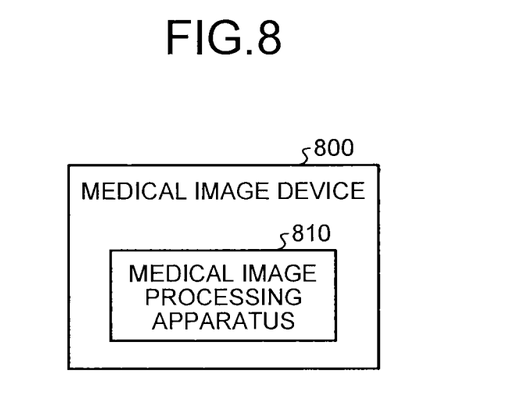
FIG. 8 is a block diagram illustrating the configuration of a medical image device according to an embodiment of the present invention.

FIG. 8 is a block diagram illustrating the configuration of a medical image device 800 according to an embodiment of the present invention.

In order not to obscure the spirit and scope of the present invention, other possible members of the medical image device 800 are omitted in FIG. 8. The medical image device 800 may include a medical image processing apparatus 810 for processing an image. The medical image processing apparatus 810 may be any of the medical image processing apparatuses 100-700. The medical image device 800 may be, but not limited to, an X-ray imaging diagnostic apparatus, an ultrasound (UL) diagnostic imaging apparatus, a computed tomography (CT) apparatus, a magnetic resonance imaging (MRI) diagnostic apparatus, a positron emission tomography (PET) apparatus and the like.

Specific means or manner, in which the medical image processing apparatus is arranged in a medical image device, is well known by those skilled in the art and is therefore not described herein.

Some processing or methods are also apparently disclosed in the aforementioned description of the medical image processing apparatus. Below, the methods are described roughly without repeating some details which are already discussed above, however, it should be noted that although the methods are disclosed in the description of the medical image processing apparatus, the methods do not certainly employ the members or are not certainly executed by the members. For example, embodiments of the medical image processing apparatus may be partially or completely achieved by hardware and/or firmware, and the image processing method described below may be fully achieved by a computer-executable program FIG. 9 is a flowchart of an image processing method 900 according to an embodiment of the present invention.

Figure 9:
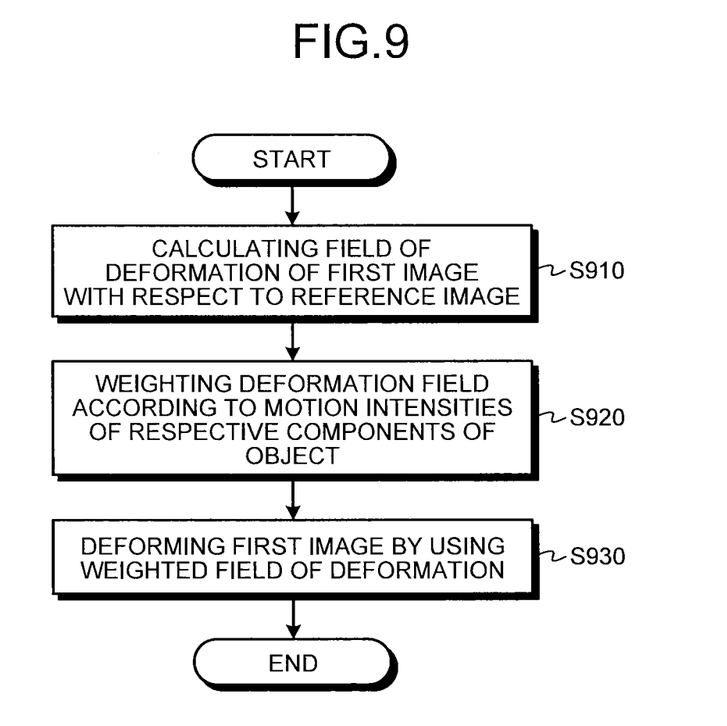
FIG. 9 is a flowchart of an image processing method according to an embodiment of the present invention.

As shown in FIG. 9, in Step S910, by taking a second image of an object as a reference image, the deformation field of a first image of the object with respect to the reference image is calculated based on non-rigid registration. For example, Step S910 may be performed by any one of the deformation field calculation units 110, 210, 310, 410, 510, 610 and 710.

In Step S920, the deformation field is weighted according to the motion intensities of the respective components of the object. For example, Step S920 may be performed by any one of the deformation field weighting units 120, 220, 320, 420, 520, 620 and 720.

For example, the deformation field may be weighted according to a variance image, which is an image of variance of the second image and a plurality of first images and is capable of reflecting the motion intensities of the respective components of the object.

Alternatively, the respective components of the object may be recognized in the first image based on an atlas, and then the deformation field is weighted according to the spatial distribution of the motion intensities of respective components as recognized.

As to the added weight, the weight of the deformation field of a motion component of the object is 1, and the weight of the deformation field of a non-motion component is smaller than 1, for example, 0. In addition, the weight of a transition component between the motion component and the non-motion component of the object is set to be between the weights of the deformation fields of the motion component and the non-motion component.

In Step S930, the first image is deformed by using the deformation field weighted in Step S920. For example, Step S930 may be performed by any one of the image deformation units 130, 230, 330, 430, 530, 630 and 730.

Prior to the deformation field calculation of Step S910, histograms of the first and second images are subjected to histogram matching to make the first image have a grayscale range similar to that of the second image. In this case, in Step S910, the deformation field of the first image having the grayscale range similar to that of to the second image with respect to the second image is calculated.

In some embodiments, after the deformation field of the first image of the object with respect to the reference image is calculated, the finally obtained deformation field is subjected to elastic restriction and/or viscous restriction. For example, the elastic restriction and the viscous restriction may be respectively performed by the elastic restriction unit 550 and the viscous restriction unit 560 described with reference to FIG. 5.

In some embodiments, after the deformation field is weighted, the weighted deformation field is subjected to elastic restriction and/or viscous restriction. For example, the elastic restriction and the viscous restriction may be respectively performed by the elastic restriction unit 650 and the viscous restriction unit 660 described with reference to FIG. 6.

For example, the elastic restriction may include Gauss filtering, and the viscous restriction may include median filtering.

Further, after a plurality of third images are obtained, at least two of the reference image and the plurality of third images are merged to obtain the final image of the object. For example, the merging may be performed by the image merging unit 770 described with reference to FIG. 7.

For example, the object may be the same position of a heart. In addition, for example, the first and second images may be medical images formed by the data obtained by a medical diagnostic device.

Figure 10:
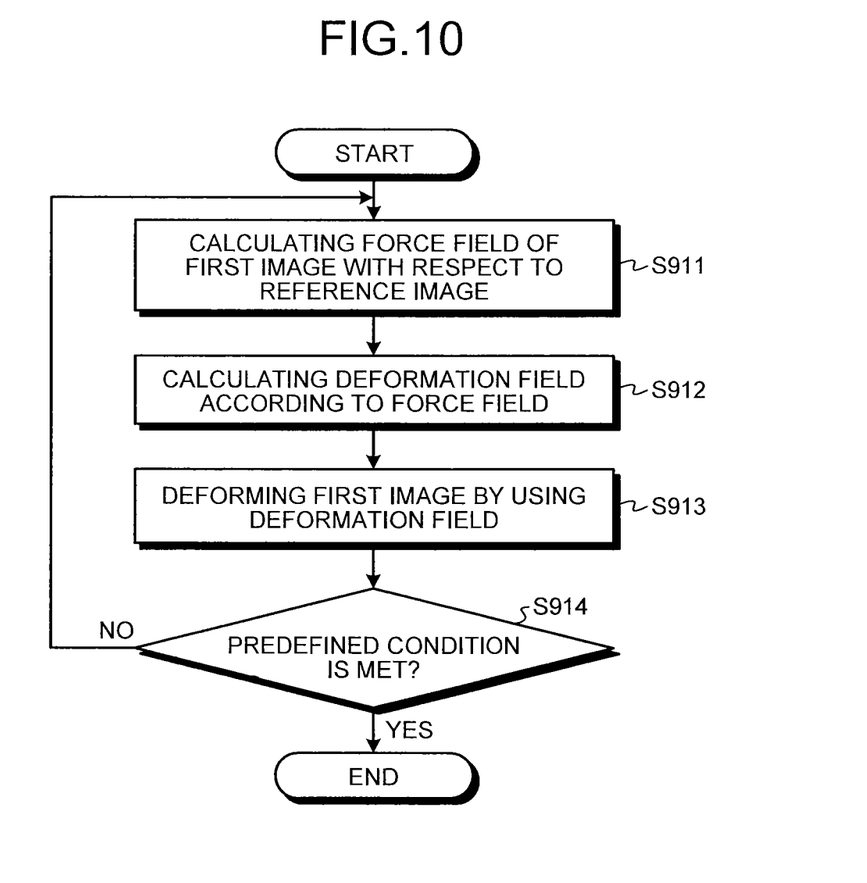
FIG. 10 is a flowchart of a deformation field calculation process according to an example of the present invention.

FIG. 10 is a flowchart of the deformation field calculation process S910 according to an example of the present invention.

As shown in FIG. 10, in Step S911, the force field of the first image with respect to the second image serving as a reference image is calculated. For example, Step S911 may be performed by the force field calculation unit 411 described with reference to FIG. 4.

In Step S912, a deformation field is calculated by using the force field calculated in Step S911. For example, Step S912 may be performed by the deformation field calculation subunit 412 described with reference to FIG. 4.

In Step S913, the first image is deformed by using the deformation field calculated in Step S912. For example, Step S913 may be performed by the image deformation subunit 413 described with reference to FIG. 4.

In Step S914, a determination is made on whether or not a predefined condition is met. If the predefined condition is not met (Step S914: No), then the above operations are repeated by using the first image after being deformed in the current iteration as the first image before being deformed in the next iteration until the predefined condition is met, so as to obtain a final deformation field. If the predefined condition is met (Step S914: Yes), then the final deformation field is obtained, and the flow is ended. For example, Step S914 may be performed by the control subunit 414 described with reference to FIG. 4.

Preferably, no viscous restriction is performed on the force field calculated in Step S911, and/or no elastic restriction is performed on the deformation field before the final deformation field is obtained.

More specific detail of each step of the image processing method and more possible steps of the image processing method may be understood with reference to the description on each member of the medical image processing apparatus provided in embodiments of the present invention and are therefore not described repeatedly here.

The medical image processing apparatus and method provided in the above embodiments may be applied to segmenting two-dimensional or three-dimensional images, without any limitation.

As an example, each step of the aforementioned image processing method and each module and/or unit of the aforementioned medical image processing apparatus may be implemented as software, firmware, hardware or the combination thereof. In the case where the steps or modules and/or units are achieved through software or firmware, a software program for realizing the above-described method is installed in a computer with a specific hardware structure (e.g. the general computer 1100 shown in FIG. 11) from a memory medium or network, and the computer, when installed with a program, is capable of realizing the functions of the program.

Figure 11:
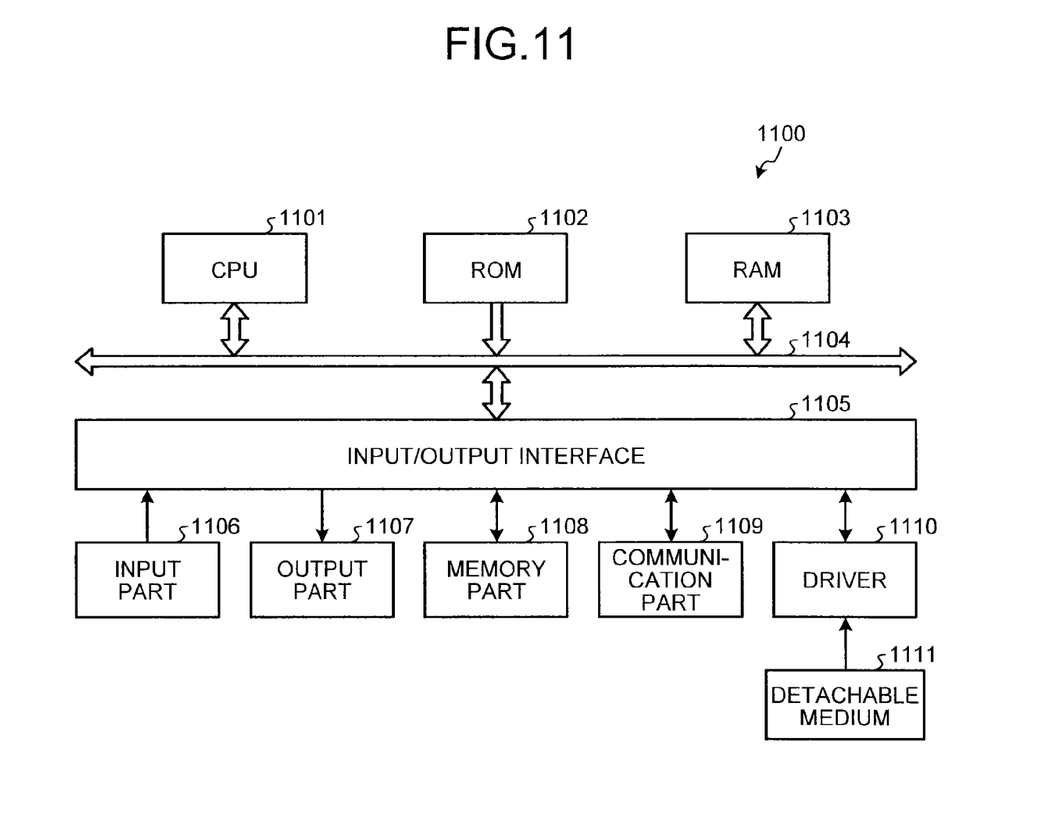
FIG. 11 is a schematic diagram illustrating the structure of a computing device for realizing the medical image processing apparatus and method disclosed herein.

In FIG. 11, an operation processing unit (i.e., CPU) 1101 executes various processing via a program stored in a read-only memory (ROM) 1102 or a program loaded to a random access memory (RAM) 1108 from a memory part 1103. The data needed for the various processing of the CPU 1103 may be stored in the RAM 1101 as needed. CPU 1101, ROM 1102 and RAM 1103 are linked with each other via a bus line 1104, with which an input/output 1105 is also connected.

The following members are linked with the input/output interface 1105: an input part 1106 (including keyboard, mouse and the like), an output part 1107 (including displays such as cathode ray tube (CRT), liquid crystal display (LCD) and loudspeaker), a memory part 1108 (including hard disc and the like), and a communication part 1109 (including a network interface card such as LAN card and modem). The communication part 1109 realizes a communication via a network such as the Internet. A driver 1110 may also be linked with the input/output interface 1105, if needed. If needed, a detachable medium 1111, for example, a magnetic disc, an optical disc, a magnetic optical disc, a semiconductor memory and the like, may be installed in the driver 1110 to read a computer program there from and install the read computer program in the memory part 1108.

In the case where the foregoing series of processing is achieved through software, programs forming the software are installed from a network such as the Internet or a memory medium such as the detachable medium 1111.

It should be appreciated by those skilled in the art that the memory medium is not limited to the detachable medium 1111 shown in FIG. 11, which is distributed separated from the apparatus so as to provide the programs for users. The detachable medium 1111 may be, for example, a magnetic disc (including floppy disc (registered trademark)), a compact disc (including compact disc read-only memory (CD-ROM) and digital versatile disc (DVD), a magneto optical disc (including mini disc (MD)(registered trademark))), and a semi-conductor memory. Alternatively, the memory mediums may be the hard discs included in ROM 1102 and the memory part 1108, and programs are stored in the memory medium and can be distributed to users along with the memory medium.

The present invention further discloses a program product in which machine-readable instruction codes are stored. The aforementioned image processing method according to embodiments of the present invention can be implemented when the instruction codes are read and executed by a machine.

Accordingly, a memory medium for embodying the program product in which computer-readable instruction codes are stored is also included in the present disclosure. The memory medium includes but is not limited to soft disc, optical disc, magnetic optical disc, memory card, memory stick and the like.

In the foregoing description on the specific embodiments of the present invention, the features described and/or shown for an embodiment may be used in one or more other embodiments in the same or similar way or merged with the those of the other embodiments, or replace those of the other embodiments.

It should be emphasized that the terms 'comprise/include', as used herein, means the existence of a feature, element, step or component in a way not exclusive of the existence or addition of one or more other features, elements, steps or components.

In the above-described embodiments and examples, each step and/or unit is represented with a reference sign consisting of numerals. It should be understood by those of ordinary skill of the art that the reference signs are merely intended to facilitate description and drawing but are not to be construed as a limitation on an order or any other aspect.

Furthermore, the methods provided in the present invention may be performed sequentially, synchronously or independently in accordance with another time sequences, not limited the time sequence described herein. Therefore, the implementation orders of the methods described in this specification are not to be construed as a limitation to the scope of the present invention.

Although the present invention has been disclosed with reference to specific embodiments herein, it should be understood that all the embodiments and examples described above are merely illustrative of the present invention but are not to be construed as limiting the present invention. Various modifications, improvements or equivalents can be devised by those skilled in the art without departing from the spirit and scope of the present invention, and such modifications, improvements or equivalents should be considered to be within the scope of the present invention.

What is claimed is:

1. A medical image processing apparatus, comprising:
   a deformation field calculation unit for calculating a field of deformation of a first image of an object with respect to a second image;
   a deformation field weighting unit for weighting the field according to motion intensities of respective components of the object; and
   an image deformation unit for deforming the first image by using the weighted field.

2. The medical image processing apparatus according to claim 1, wherein the deformation field weighting unit is configured to weight the field according to a variance image, which is an image of variance of the second image and a plurality of first images and is capable of reflecting the motion intensities of the respective components of the object.

3. The medical image processing apparatus according to claim 1, wherein the deformation field weighting unit comprises:
   an atlas recognition subunit for recognizing the respective components of the object from the first image based on an atlas; and
   a deformation field weighting subunit for weighting the field according to spatial distribution of the motion intensities of the respective components as recognized.

4. The medical image processing apparatus according to claim 1, wherein the deformation field weighting unit is configured to set the weight of the field of a motion component of the object to be 1 and the weight of the field of a non-motion component of the object to be smaller than 1.

5. The medical image processing apparatus according to claim 4, wherein the deformation field weighting unit is configured to set the weight of the field of a transition component between the motion component and the non-motion component of the object to be between the weights of the fields of the motion component and the non-motion component.

6. The medical image processing apparatus according to claim 1, further comprising:
a histogram matching unit for performing histogram matching between histograms of the first and second images to make the first image have a grayscale range similar to that of the second image,
wherein the deformation field calculation unit is configured to calculate the field of the first image having the grayscale range similar to that of the second image with respect to the second image.

7. The medical image processing apparatus according to claim 1, wherein the deformation field calculation unit comprises:
a force field calculation subunit for calculating the force field of the first image with respect to the second image;
a deformation field calculation subunit for calculating a deformation field according to the force field;
an image deformation subunit for deforming the first image by using the deformation field; and
a control subunit for controlling the force field calculation subunit, the deformation field calculation subunit and the image deformation subunit to repeat the above operations by using the first image after being deformed in the current iteration as the first image before being deformed in the next iteration, until a predefined condition is met, so as to obtain a final deformation field.

8. The medical image processing apparatus according to claim 7, further comprising:
an elastic restriction unit for performing elastic restriction on the calculated deformation field; and/or
a viscous restriction unit for performing viscous restriction on the calculated deformation field.

9. The medical image processing apparatus according to claim 8, wherein the elastic restriction comprises Gauss filtering.

10. The medical image processing apparatus according to claim 8, wherein the viscous restriction comprises median filtering.

11. The medical image processing apparatus according to claim 7, further comprising:
an elastic restriction unit for performing elastic restriction on the weighted deformation field; and/or
a viscous restriction unit for performing viscous restriction on the weighted deformation field.

12. The medical image processing apparatus according to claim 1, further comprising:
an image merging unit for merging at least two of the second image and a plurality of first images after being deformed to obtain the final image of the object.

13. The medical image processing apparatus according to claim 1, wherein the object is the same position of a heart.

14. The medical image processing apparatus according to claim 1, wherein the first and second images are medical images formed by the data obtained by a medical diagnostic device.

15. A medical image device, comprising a medical image processing apparatus, wherein
the medical image processing apparatus includes:
a deformation field calculation unit for calculating a field of deformation of a first image of an object with respect to a second image;
a deformation field weighting unit for weighting the field according to motion intensities of respective components of the object; and
an image deformation unit for deforming the first image by using the weighted field.

16. An image processing method, comprising:
calculating a field of deformation of a first image of an object with respect to a second image;
weighting the field according to motion intensities of respective components of the object; and
deforming the first image by using the weighted field.

* * * * *